(12) United States Patent
Usami et al.

(10) Patent No.: US 9,807,945 B2
(45) Date of Patent: Nov. 7, 2017

(54) ILLUMINATION APPARATUS USED FOR PLANT CULTIVATION

(71) Applicant: FUJIFILM Corporation, Tokyo (JP)

(72) Inventors: Yoshihisa Usami, Ashigarakami-gun (JP); Mitsuyoshi Ichihashi, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 66 days.

(21) Appl. No.: 14/577,120

(22) Filed: Dec. 19, 2014

(65) Prior Publication Data

US 2015/0101246 A1    Apr. 16, 2015

Related U.S. Application Data

(63) Continuation of application No. PCT/JP2013/066783, filed on Jun. 19, 2013.

(30) Foreign Application Priority Data

Jun. 20, 2012  (JP) .................. 2012-138404

(51) Int. Cl.
*A01G 7/04* (2006.01)
*F21V 9/14* (2006.01)

(52) U.S. Cl.
CPC .............. *A01G 7/045* (2013.01); *F21V 9/14* (2013.01); *Y02P 60/146* (2015.11)

(58) Field of Classification Search
CPC ................... A01G 7/045; F21V 9/14
See application file for complete search history.

(56) References Cited

U.S. PATENT DOCUMENTS

| | | | |
|---|---|---|---|
| 6,921,182 B2* | 7/2005 | Anderson, Jr. ........ | A01G 7/045 362/230 |
| 2011/0187973 A1 | 8/2011 | Oki et al. | |
| 2014/0041296 A1 | 2/2014 | Ichihashi et al. | |

FOREIGN PATENT DOCUMENTS

| | | | |
|---|---|---|---|
| JP | 62-53125 A | | 3/1987 |
| JP | 4-56575 A | | 2/1992 |
| JP | 2002-247919 A | | 9/2002 |
| JP | 2007-267616 A | | 10/2007 |
| JP | 2007267616 A | * | 10/2007 |
| JP | 2008-228688 A | | 10/2008 |
| JP | 2008228688 A | * | 10/2008 |

(Continued)

OTHER PUBLICATIONS

Office Action dated Sep. 22, 2016, issued by the Korean Intellectual Property Office in corresponding Korean Application No. 10-2014-7036688.

(Continued)

*Primary Examiner* — Anh Mai
*Assistant Examiner* — Nathaniel Lee
(74) *Attorney, Agent, or Firm* — Sughrue Mion, PLLC (57) ABSTRACT

The present invention provides an illumination apparatus for plant cultivation, including a unit configured to change light in any wavelength region of 300 nm or higher and 600 nm or lower (wavelengths of 452 nm to 474 nm, for example) to light in the wavelength region having dominantly a right-circularly polarized light component. The illumination apparatus of the present invention enables irradiation with light that is capable of giving a specific effect in plant cultivation.

9 Claims, 3 Drawing Sheets

(56) References Cited

FOREIGN PATENT DOCUMENTS

JP    2012-226229 A    11/2012

OTHER PUBLICATIONS

Office Action dated Dec. 13, 2016, from the Intellectual Property Office of Taiwan in corresponding Taiwanese Application No. 102118869.
Database WPI Week 201274 Thomson Scientific, London, GB; AN 2012-N95789, XP002756935 (total 2 pages).
Database WPI Week 200477 Thomson Scientific, London, GB; AN 2004-778884, XP002756936 (total 1 page).
Office Action dated May 5, 2016 from the State Intellectual Property Office of the P.R.C. in counterpart Chinese Application No. 201380031966.5.
Extended European Search Report dated May 20, 2016 from the European Patent Office in counterpart European Application No. 13807535.3.
Office Action dated Nov. 17, 2015, issued by the Japan Patent Office in corresponding Japanese Application No. 2012-138404.
Office Action dated Nov. 18, 2015, issued by the State Intellectual Property Office of the P.R.C. in corresponding Chinese Application No. 201380031966.5.
Wang, T. et al., "Effects of different LED light qualities on growth and physiological characteristics of non-heading Chinese cabbage", Journal of Gansu Agricultural University, Aug. 2011, Issue No. 4, pp. 69-73.
International Preliminary Report on Patentability dated Dec. 31, 2014 from the International Searching Authority in counterpart Application No. PCT/JP2013/066783.
Written Opinion of the International Searching Authority for PCT/JP2013/066783 dated Sep. 24, 2013.
Takatsuji Masaki et al, "Complete Control-Type Plant Factory", 1st edition 2007.
International Search Report for PCT/JP2013/066783 dated Sep. 24, 2013.
Office Action dated Feb. 23, 2016, from the Japanese Patent Office in counterpart Japanese Application No. 2012-138404.

* cited by examiner

ILLUMINATION APPARATUS USED FOR PLANT CULTIVATION

CROSS-REFERENCE TO RELATED APPLICATIONS

This application is a continuation of PCT International Patent Application No. PCT/JP2013/066783, filed on Jun. 19, 2013, which claims priority under 35 U.S.C. §119 (a) to Japanese Patent Application No. 2012-138404 filed on Jun. 20, 2012, the entire contents of both of which are incorporated herein by reference.

BACKGROUND OF THE INVENTION

Field of the Invention

The present invention relates to an illumination apparatus used for plant cultivation. The present invention also relates to a method of cultivating a plant.

Description of the Related Art

It is considered that there is a case where a polarization state of light gives a certain influence on growth or the like of a plant (Patent Literatures 1 and 2). For example, in Patent Literature 1, an apparatus for controlling organism behavior including a polarized light irradiation mechanism is disclosed and it is shown that the growth of Arabidopsis was accelerated by irradiating the same with exclusively red right-circularly polarized light in an experiment using the apparatus.

On the other hand, studies have been performed conventionally on the influence that is given to a plant by a wavelength of light with which the plant is irradiated (for example, Patent Literatures 3 and 4, Non-Patent Literature 1). In Non-Patent Literature 1, there is a description suggesting that blending of red light and blue light in a balanced manner is necessary for a healthy growth of a plant and a ratio of red light/blue light of 10/1 or 5/1 is suitable in the unit of a photon flux density.

CITATION LIST

Patent Literature

[Patent Literature 1] Japanese Patent Application Laid-Open No. 2008-228688
[Patent Literature 2] Japanese Examined Patent Application No. 62-53125
[Patent Literature 3] Japanese Patent Application Laid-Open No. 2002-247919
[Patent Literature 4] Japanese Examined Patent Application No. 04-56575

Non-Patent Literature

Takatsuji Masaki, "Complete Control-Type Plant Factory" 1st edition, (2007), published by Ohmsha, Ltd.

SUMMARY OF THE INVENTION

An object of the present invention is to provide an illumination apparatus used for plant cultivation. An object of the present invention is, in particular, to provide an illumination apparatus that is capable of irradiation with light that is capable of giving a specific effect in plant cultivation.

In order to achieve the above-described objects, the inventors of the present application carried out experiments on the influence given to the growth of a plant by light having various wavelengths and polarization properties, in the anticipation that a remarkable effect would be found in the growth of a plant specifically in right-circularly polarized light of red light based on findings obtained from prior art. As the result, surprisingly, they have found that a distinct effect is not able to be obtained by specific circularly polarized light in red light, whereas, in blue light, right-circularly polarized light remarkably accelerates the growth and increases a specific component in a plant, and have completed the present invention on the basis of the findings. The present invention thus provides the following (1) to (15).

(1) An illumination apparatus for plant cultivation, including a unit configured to change light in any wavelength region of 300 nm or higher and 600 nm or lower to light in the wavelength region having dominantly a right-circularly polarized light component.

(2) The illumination apparatus according to (1), including a unit configured to change light of wavelengths of 452 nm to 474 nm to light of wavelengths of 452 nm to 474 nm having dominantly a right-circularly polarized light component.

(3) The illumination apparatus according to (1) or (2), emitting substantially non-polarized light in at least a part of wavelengths of 601 nm to 800 nm, or substantially not emitting light in at least a part of wavelengths of 601 nm to 800 nm.

(4) The illumination apparatus according to (1) or (2), emitting substantially non-polarized light in wavelengths of 620 nm to 640 nm.

(5) The illumination apparatus according to any one of (1) to (4), wherein the unit substantially does not change a polarization state of light of wavelengths of 620 nm to 640 nm.

(6) The illumination apparatus according to any one of (1) to (5), including a light source.

(7) The illumination apparatus according to (6), wherein the light source is a blue light-emitting diode.

(8) The illumination apparatus according to any one of (1) to (7), wherein the unit includes a polarizing plate and a retardation plate.

(9) The illumination apparatus according to any one of (1) to (8), including a wavelength selective filter.

(10) An illumination apparatus, including a blue light-emitting diode and a unit configured to change light of wavelengths of 452 nm to 474 nm to light having dominantly a right-circularly polarized light component in a wavelength region of wavelengths of 452 nm to 474 nm.

(11) An illumination apparatus, including a light source that emits light of wavelengths of 452 nm to 474 nm, a light source that emits light of wavelengths of 620 nm to 640 nm and a unit configured to change light in a wavelength region of wavelengths of 452 nm to 474 nm to light having dominantly a right-circularly polarized light component in a wavelength region of wavelengths of 452 nm to 474 nm, and emitting substantially non-polarized light in wavelengths of 620 nm to 640 nm.

(12) An illumination apparatus, including a light source that emits light of wavelengths of 452 nm to 474 nm, a light source that emits light of wavelengths of 620 nm to 640 nm and a unit configured to change light in a wavelength region of wavelengths of 452 nm to 474 nm to light having dominantly a right-circularly polarized light component in a wavelength region of wavelengths of 452 nm to 474 nm and substantially not to change a polarization state of light of wavelengths of 620 nm to 640 nm.

(13) A method of cultivating a plant, including irradiation with light having dominantly a right-circularly polarized light component in any of a wavelength region of 300 nm or higher and 600 nm or lower.

(14) The method of cultivating a plant according to (13), including irradiation with light having dominantly a right-circularly polarized light component in wavelengths of 452 nm to 474 nm.

(15) The method of cultivating a plant according to (13) or (14), including irradiation with light of substantially non-polarized light in wavelengths of 620 nm to 640 nm.

Effect of the Invention

According to the present invention, an illumination apparatus capable of irradiation with light capable of giving a specific effect particularly in plant cultivation is provided.

MODES OF CARRYING OUT THE INVENTION

Hereinafter, the present invention will be explained in detail.

Note that "to" in the present description is used to mean that numerical values written down before and after thereof are included as the lower limit and the upper limit.

The illumination apparatus of the present invention includes a unit configured to change light in any of a wavelength region of 300 nm or higher and 600 nm or lower to light in the aforementioned wavelength region including dominantly a right-circularly polarized light component.

Here, a polarized state of light can be represented by the sum of right-circularly polarized light and left-circularly polarized light. For example, when intensities (light quantities) of left- and right-circularly polarized light components are equal to each other, the sum thereof results in linearly polarized light, and the electric vector thereof vibrates in the direction determined by the phase difference between the left-circularly polarized light and right-circularly polarized light. When intensities of a right-circularly polarized light component and a left-circularly polarized light component are different from each other, the sum results in elliptically polarized light, and when either component alone exists, the sum results in complete circularly polarized light.

The illumination apparatus of the present invention includes light in any of a wavelength region of 300 nm or higher and 600 nm or lower as light to be emitted, wherein the light in any of the wavelength region of 300 nm or higher and 600 nm or lower includes dominantly a right-circularly polarized light component.

The wavelength region of light including dominantly a right-circularly polarized light component may be the entire region of 300 nm or higher and 600 nm or lower, or may be a wavelength region such as 550 nm or lower, 500 nm or lower, or 300 nm or higher, 350 nm or higher, and 400 nm or higher. The wavelength region, in particular, is preferably a wavelength region including a wavelength region referred to as blue light, and specifically, is preferably a wavelength region including 460 nm. The wavelength region including 460 nm may be, for example, 452 nm to 474 nm, 430 nm to 490 nm, 440 nm to 480 nm, 450 nm to 470 nm, 455 nm to 465 nm, 459 nm to 461 nm, or the like.

The fact that light includes dominantly a right-circularly polarized light component means that a light quantity of a right-circularly polarized light component is larger relative to that of a left-circularly polarized light component in light. Specifically, the light quantity of a right-circularly polarized light component may be 1.5 times or more, 2 times or more, 3 times or more, 4 times or more, 5 times or more, or 10 times or more relative to the light quantity of a left-circularly polarized light component, and a right-circularly polarized light component may be substantially 100%. In order to represent the ratio of a circularly polarized light component of light, the percentage of right-circularly polarized light is used in the present description. The percentage of right-circularly polarized light is a value represented by "(right-circularly polarized light quantity)/(right-circularly polarized light quantity+left-circularly polarized light quantity)." The percentage of right-circularly polarized light may be 0.60 or more, 0.70 or more, 0.80 or more, 0.90 or more, 0.95 or more, or the like, and may be substantially 1.

The illumination apparatus of the present invention may be an illumination apparatus that exclusively emits light including dominantly a right-circularly polarized light component in light exclusively in any of a wavelength region of 300 nm or higher and 600 nm or lower. For example, it may be an illumination apparatus having a blue light-emitting diode having a maximum emission intensity near a wavelength of 460 nm as a light source and having a unit configured to change light in the wavelength region of emission of the blue light-emitting diode, to light including dominantly a right-circularly polarized light component. Alternatively, a wavelength selective filter may be utilized.

The illumination apparatus of the present invention may be an illumination apparatus that emits light also in a wavelength region other than a wavelength region of light including dominantly a right-circularly polarized light component in 300 nm or higher and 600 nm or lower (hereinafter, the wavelength region may be referred to as a right-circularly polarized light wavelength region). In this case, the light quantity of light in the right-circularly polarized light wavelength region relative to the total light quantity emitted from the illumination apparatus may be 1% or higher, 5% or higher, 10% or higher, 20% or higher, 50% or higher, and the like.

The illumination apparatus of the present invention preferably can substantially emit light of non-polarized light in a wavelength region including 630 nm such as wavelengths of 601 nm to 800 nm, preferably 610 to 750 nm and more preferably 620 to 700 nm. The light of substantially non-polarized light means light in which right-circularly polarized light and left-circularly polarized light are contained substantially in the same quantity.

The polarization state at respective wavelengths of light emitted from the illumination apparatus can be measured using a spectral radiance meter or a spectrometer mounting a circularly-polarizing plate. In this case, the intensity of light measured through a right-circularly-polarizing plate corresponds to $I_R$, and the intensity of light measured through a left-circularly-polarizing plate corresponds to $I_L$. Furthermore, ordinary light sources such as an incandescent light bulb, a mercury lamp, a fluorescent lamp and LED emit approximately natural light, and properties of producing polarized light of the polarization state-control member when being mounted on these can be measured using, for example, a polarized light phase difference-analyzing apparatus "AxoScan" manufactured by Axometrics, Inc., and the like.

The polarization state can be measured also by attaching a circularly-polarizing plate to an illuminometer or a light spectrometer. The percentage can be measured by measuring a right-circularly polarized light quantity while attaching a right-circularly polarized light transmitting plate, and by measuring a left-circularly polarized light quantity while attaching a left-circularly polarized light transmitting plate.

(Configuration of Illumination Apparatus)

The illumination apparatus of the present invention includes a unit configured to change light in any of a wavelength region of 300 nm or higher and 600 nm or lower, to light of the aforementioned wavelength region including dominantly a right-circularly polarized light component. The unit configured to change light in any of a wavelength region of 300 nm or higher and 600 nm or lower, to light in the aforementioned wavelength region including dominantly a right-circularly polarized light component may be a polarization state-control member that controls the polarization state of incident light and generates circularly polarized light.

Furthermore, the illumination apparatus of the present invention may have a light source.

Figure 1:
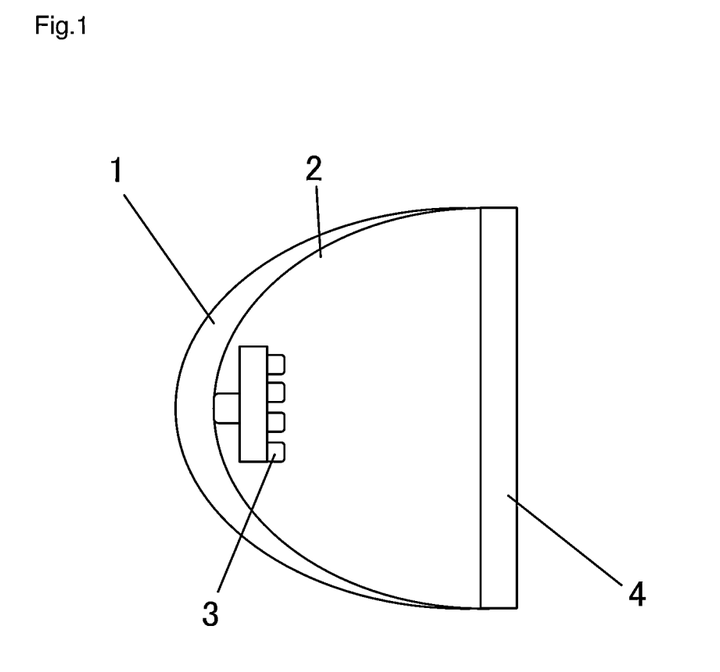
FIG. 1 is a schematic view showing an example of an illumination apparatus.

A basic configuration of one example of an illumination apparatus is shown in FIG. 1.

FIG. 1 is an illumination apparatus in which a sheet-like polarization state-control member 4 is disposed at an opening of a reflective housing 1 that holds an emission light source 3.

Note that in FIG. 1, 2 represents a reflection surface (reflection film). When a protective plate is disposed outside the polarization state-control member, it becomes necessary that birefringence hardly exists so as not to disturb a circularly-polarized state.

(Other Members)

The illumination apparatus of the present invention may have, furthermore as necessary, other members such as a reflection member, a heat release member, an infrared-ray absorption member, an ultraviolet-ray absorption member, a lens, a prism.

(Light Source)

The light source of the illumination apparatus of the present invention is not particularly limited. Examples thereof include an LED, a discharge lamp such as a fluorescent lamp, a xenon lamp, a mercury lamp, a sodium lamp or a metal halide lamp, lamps using a filament such as a halogen lamp and an incandescent light bulb, inorganic/organic EL lamps, an electrodeless lamp, and the like. From the viewpoint of efficiency, the LED, the discharge lamp, the electrodeless lamp and the organic EL lamp are preferable, and the LED, the discharge lamp and the organic EL lamp which have a high efficiency in a wavelength region of 300 to 800 nm effective for photosynthesis is particularly preferable. The LED having the highest electricity/light efficiency is most preferable.

Light of a wavelength obtained by emission may be used as it is, or light converted by a fluorescent substance may be used.

As another example, the utilization of sunlight is also possible.

<Polarization State-Control Member>

The polarization state-control member is a member that controls a polarization state of light entering from a light source.

Here, "to control a polarization state of light entering from a light source" means to adjust the difference between a polarization state of light immediately after being emitted from a light source and a polarization state of light having passed through the polarization state-control member.

At least one control wavelength bandwidth of the polarization state-control member is preferably from 60 nm or higher to 250 nm or lower, more preferably 80 nm to 200 nm. When the control wavelength bandwidth is lower than 60 nm, the growth control effect of a plant, which is targeted, may not appear, and when the wavelength exceeds 250 nm, the overlapping of a plurality of growth control effects may cancel the effects.

Here, the control wavelength bandwidth can be measured by, for example, a polarized light phase difference-analyzing apparatus "AxoScan" manufactured by Axometrics, etc.

The polarization state-control member is not particularly limited, and can be appropriately selected in accordance with a purpose, and examples of these include a polarizing plate, a circularly-polarizing plate, a circularly polarizing reflection plate, and the like. Among these, from the viewpoint of a growth control effect of a plant and a utilization efficiency of light, the circularly polarizing reflection plate is particularly preferable.

Note that the polarization state-control member is preferably removable and exchangeable.

<<Circularly-Polarizing Plate>>

The circularly-polarizing plate includes an retardation plate and a polarizing plate, and specifically, includes a linearly-polarizing plate and a quarter wave plate (λ/4 wavelength plate). When the circularly-polarizing plate is used as the polarization state-control member, the wavelength selectivity in a polarization state can be controlled through the use of a polarizing plate having absorption dichroism of linearly-polarized light in a part of an emission wavelength region.

—Linearly-Polarizing Plate—

A linearly-polarizing plate is a member that lets a specific linearly polarized light pass through, and absorbs linearly polarized light that is orthogonal to the specific linearly polarized light, among the light going through the member.

The linearly-polarizing plate includes at least a polarizing layer, and a base material and, additionally, other layers as necessary.

—Polarizing Layer—

The polarizing layer contains at least a polarizing element, and contains a binder resin, and additionally, other components as necessary.

Examples of the polarizing element include iodine, dichromic dye, anisotropic metal nano particles, a carbon nano tube, metal complexes and the like.

The binder resin is not particularly limited, and can be appropriately selected in accordance with the purpose, and examples thereof include polyvinyl alcohol, polymethacrylic acid, polyacrylic acid, polyethylene terephthalate, polyvinyl butyral, polymethyl methacrylate, polyvinyl formal, polycarbonate, cellulose butyrate, polystyrene, polyvinyl chloride, polyvinylidene chloride, polyethylene adipamide, polyvinyl acetate, copolymers thereof (such as vinyl chloride—vinyl acetate copolymer, styrene—methyl methacrylate copolymer), etc. These may be used alone, or in combination of two or more kinds thereof.

The thickness of the polarizing layer is not particularly limited and can be appropriately selected in accordance with the purpose, and is preferably 10 μm to 300 μm.

—Base Material—

The shape, structure, size etc. of the base material are not particularly limited and can be appropriately selected in accordance with the purpose, and examples of the shape include a flat plate-like shape, a sheet-like shape and the like. The structure may have, for example, a single layer structure or a laminated structure, which can be appropriately selected.

The material of the base material is not particularly limited, and both an inorganic material and an organic material can be suitably used.

Examples of the inorganic material include glass, quartz, silicon and the like.

Examples of the organic material include acetate-based resins such as triacetyl cellulose (TAC); polyester-based resins, polyethersulfone-based resins, polysulfone-based resins, polycarbonate-based resins, polyamide-based resins, polyimide-based resins, polyolefin-based resins, acrylic-based resins, polynorbornene-based resins, cellulose, polyarylate-based resins, polystyrene-based resins, polyvinyl alcohol-based resins, polyvinyl chloride-based resins, polyvinylidene chloride-based resins, and the like. They may be used alone, or may be used in combination of two or more kinds thereof.

The base material may be one that has appropriately been synthesized, or a commercially available product may be used as the base material.

The thickness of the base material is not particularly limited and can be appropriately selected in accordance with the purpose, and is preferably 10 μm to 2,000 μm, more preferably 50 μm to 500 μm.

The polarizing plate can be manufactured by stretching, in a definite direction, an applied film obtained by applying an application liquid containing a polarizing element and a binder resin onto the base material and drying the same.

—Quarter Wave Plate—

The quarter wave plate is not particularly limited and can be appropriately selected in accordance with the purpose, and examples of these include a stretched polycarbonate film, a stretched norbornene-based polymer film, a transparent film aligned while containing an inorganic particle having birefringence such as strontium carbonate, a thin film obtained by obliquely depositing an inorganic dielectric substance on a support, and the like.

Examples of the quarter wave plate include (1) a retardation plate obtained by laminating a birefringent film having large retardation and a birefringent film having small retardation such that optical axes thereof cross at right angle as described in Japanese Patent Application Laid-Open No. 5-27118 or 5-27119, (2) a retardation plate obtained by laminating a polymer film that gives λ/4 wavelength at a specific wavelength and a polymer film that is constituted of the same material and that gives λ/2 wavelength at the same wavelength to thereby give λ/4 wavelength in a wide wavelength region as described in Japanese Patent Application Laid-Open No. 10-68816, (3) a retardation plate capable of achieving λ/4 wavelength in a wide wavelength region by laminating two polymer films as described in Japanese Patent Application Laid-Open No. 10-90521, (4) a retardation plate that is capable of achieving λ/4 wavelength in a wide wavelength region and that uses a modified polycarbonate film as described in International Publication No. 00/26705 pamphlet, (5) a retardation plate that is capable of achieving λ/4 wavelength in a wide wavelength region and that uses a cellulose acetate film as described in International Publication No. 00/65384 pamphlet, and the like.

As such a quarter wave plate, a commercially available product can be used, and for example, trade name "Pureace WR" (manufactured by Teijin Limited) and the like are included.

The circularly-polarizing plate used in the present invention includes the linearly-polarizing plate and the quarter wave plate, and is constituted by pasting these plates such that the angle of the optical axis of the quarter wave plate relative to the polarized light absorption axis of the linearly-polarizing plate becomes 45 degrees. Examples of the pasting method include a method of performing lamination of rolls each other by using an adhesive film, and the like. Polarized light conversion to circularly polarized light can be carried out by mounting the circularly-polarizing plate on an emission light source while disposing the linearly-polarizing plate as a face closer to the light source and using the same.

<<Circularly Polarizing Reflection Plate>>

The circularly polarizing reflection plate includes (1) one having a cholesteric liquid crystalline structure, (2) one including a linearly polarizing reflection plate and a quarter wave plate, and the like.

—(1) One Having a Cholesteric Liquid Crystal Structure—

A cholesteric layer exhibiting circularly polarized light selective reflection requires to be adjusted so as to have a selective reflection central wavelength in accordance with the wavelength of an emission light source. Liquid crystalline phases exhibiting the circularly polarized light selective reflection include a cholesteric liquid crystalline phase having a helical structure and a chiral smectic liquid crystalline phase. A liquid crystalline substance exhibiting the cholesteric liquid crystalline phase or the chiral smectic liquid crystalline phase can be formed by mixing a non-chiral liquid crystalline compound and a chiral compound. Furthermore, as an alternative method, the substance can be obtained by copolymerizing these compounds to thereby form a polymer liquid crystal or a polymer film.

The central wavelength $\lambda$, of the selective reflection band depends on a pitch length P of the helical structure (=cycle of helix) in the cholesteric phase and chiral smectic phase, and follows the relationship between n being an average refractive index of the cholesteric layer and $\lambda = n \times P$. Therefore, by adjusting the pitch length of the helical structure, a wavelength exhibiting a selective reflection property can be controlled. The pitch length depends on the kind of a chiral compound in a liquid crystal composition or the addition concentration thereof and thus an intended pitch length can be obtained by adjusting these. Furthermore, as to the half-width of the selective reflection band, $\Delta\lambda$, $\Delta\lambda$ depends on the birefringence $\Delta n$ of a liquid crystal compound and the pitch length P, and follows the relationship of $\Delta\lambda = \Delta n \times P$. Therefore, the control of the width of the selective reflection band can be carried out by adjusting $\Delta n$. The adjustment of $\Delta n$ can be carried out by adjusting the kind or mixing ratio of liquid crystals, or adjusting temperature at the time of alignment fixing. Moreover, as another method of expanding the width of the selective reflection band, a method of laminating two or more cholesteric liquid crystal layers having shifted pitch lengths P, or of changing the pitch in the thickness direction of the cholesteric layer can be used.

In the selective reflection by the cholesteric liquid crystal, when the twist direction of helix (sense) of the cholesteric liquid crystal is right-handed, right-circularly polarized light is reflected and left-circularly polarized light is allowed to pass through, and when the sense is left-handed, left-circularly polarized light is reflected and right-circularly polarized light is allowed to pass through. Therefore, when the irradiation with left-circularly polarized light is to be performed for the growth control of a plant and the irradiation with a right-circularly polarized light component is not to be performed, a cholesteric liquid crystal layer of right-twisted sense can be used as the polarization-state control member, and when the irradiation with right-circularly polarized light is to be performed and the irradiation with a left-circularly polarized light component is not to be performed, a cholesteric liquid crystal layer of left-twisted sense can be used as the polarization-state control member.

Furthermore, the circularly polarizing reflection plate may have two or more polarized light control wavelength bands. The case is preferable in that two or more kinds of growth control functions can be obtained at the same time, when using the system of the present invention for the growth of a plant.

Hereinafter, materials constituting the cholesteric layer and a method for forming the cholesteric layer will be explained.

The cholesteric layer can be obtained by fixing a cholesteric liquid crystalline composition containing a liquid crystalline compound and a chiral compound, and containing an air interface alignment control agent, another compounding agent that is added as necessary (such as a polymerization initiator, a cross-linking agent, a surfactant) and other arbitrary component.

As the liquid crystalline compound, a low-molecular-weight liquid crystalline compound and a high-molecular-weight liquid crystalline compound are preferable, and the low-molecular-weight liquid crystal compound is more preferable because of short alignment time and high alignment evenness.

The liquid crystalline compound preferably has a polymerizable group, and more preferably exhibits a nematic phase or a chiral smectic phase. Furthermore, the molecular shape is preferably discotic or rod-like, is more preferably rod-like from the viewpoint of productivity, and is more preferably discotic when the reduction of angle dependency of the width of selective reflection is important. Rod-like nematic liquid crystalline compounds without a polymerizable group are described in various literatures (for example, Y. Goto et al., Mol. Cryst. Liq. Cryst. 1995, Vol. 260, pp. 23-28).

The polymerizable group can be introduced into a nematic liquid crystalline compound by a known method, without particular limitation. The polymerizable group is not particularly limited and can be appropriately selected in accordance with the purpose, and examples thereof include an epoxy group, a thioepoxy group, an oxetane group, a thiethanyl group, an aziridinyl group, a pyrrole group, a fumarate group, a cinnamoyl group, an isocyanate group, an isothiocyanate group, an amino group, a hydroxyl group, a carboxyl group, an alkoxysilyl group, a mercapto group, a vinyl group, an allyl group, a methacrylic group, an acrylic group, and the like. These may be used alone or in combination of two or more kinds thereof.

As a discotic compounds having a polymerizable group, compounds described in Japanese Patent Application Laid-Open No. 08-27284, 2001-100028 or 2006-76992 can be suitably used. The simultaneous use of two or more kinds of polymerizable nematic liquid crystalline compounds makes it possible to suppress the deposition of a crystal at the time of application and alignment, or to lower alignment temperature.

For example, a cholesteric liquid crystalline composition is obtained by mixing a polymerizable nematic liquid crystalline compound and a chiral compound (optically active compound).

The chiral compound is not particularly limited, and a known compound (for example, those described in Liquid Crystal Device Handbook, Chap. 3, Section 4-3, Chiral agent for TN, STN, p 199, edited by Japan Society for the Promotion of Science, No. 142 Committee, 1989), isosorbide or an isomannide derivative can be used.

The chiral compound (optically active compound) generally contains an asymmetric carbon atom, but an axially asymmetric compound or a planarly asymmetric compound which does not contain an asymmetric carbon atom can also be used as the chiral compound.

Examples of the axially asymmetric compound or planarly asymmetric compound include binaphthyl, helicene, paracyclophane, derivatives thereof and the like.

A chiral compound that induces a helical structure to a cholesteric liquid crystal has different sense of helix or pitch of helix to be induced depending on compounds, and thus the selection of a compound in accordance with the purpose is preferable. As a method for measuring sense or pitch of helix, a method described in "Easy Steps in Liquid Crystal Chemistry Experiment" p 46, edited by The Japanese Liquid Crystal Society, Sigma Publishing, published in 2007, and "Liquid Crystal Handbook" p 196, Editorial Committee of Liquid Crystal Handbook, Maruzen can be used.

The chiral compound may have a polymerizable group. When the chiral compound has a polymerizable group, a polymer having a nematic crystalline repeating unit and an optically active structure can be formed by a polymerization reaction of a polymerizable nematic liquid crystalline compound. The polymerizable group of the optically active compound is preferably the same group as the polymerizable group of the polymerizable nematic liquid crystalline compound. Accordingly, the polymerizable group of the optically active compound is also preferably an unsaturated polymerizable group, an epoxy group, an aziridinyl group, or the like, more preferably an unsaturated polymerizable group, further more preferably an ethylenically unsaturated polymerizable group.

When the chiral agent has a photoisomerization group, a pattern of an intended reflection wavelength corresponding to an emission wavelength can be formed by application and alignment, followed by photomask irradiation with an active ray or the like, which is preferable. As the photoisomerization group, an isomerization site of a compound exhibiting a photochromic property, an azo group, an azoxy group, and a cinnamoyl group are preferable. As a specific compound, a compound described in Japanese Patent Application Laid-Open No. 2002-80478, 2002-80851, 2002-179668, 2002-179669, 2002-179670, 2002-179681, 2002-179682, 2002-338575, 2002-338668, 2003-313189 or 2003-313292 can be used.

The content of the optically active compound is preferably 0.01% by mole to 200% by mole of the quantity of the polymerizable nematic liquid crystalline compound, more preferably 1% by mole to 30% by mole.

A polymerization initiator for a polymerization reaction is preferably added to the cholesteric liquid crystalline composition. The polymerization reaction includes a thermal polymerization reaction that uses a thermal polymerization initiator and a photo polymerization reaction that uses a photo polymerization initiator. Among these, the photo polymerization reaction that uses a photo polymerization initiator is particularly preferable.

The photo polymerization initiator is not particularly limited and can be appropriately selected in accordance with the purpose, and examples thereof include an α-carbonyl compound, acyloin ether, an α-hydrocarbon-substituted aromatic acyloin compound, a polynuclear quinone compound, a combination of triarylimidazol dimer and p-aminophenyl ketone, an oxadiazole compound, a halomethylated triazine derivative, a halomethylated oxadiazole derivative, an imidazole derivative, an anthraquinone derivative, a benzanthrone derivative, a benzophenone derivative, a thioxanthone derivative, an acridine derivative, a phenazine derivative, an oxime derivative, and the like.

The content of the photo polymerization initiator is preferably 0.01% by mass to 20% by mass of the solid content in the cholesteric liquid crystalline composition, more preferably 0.5% by mass to 5% by mass.

In the polymerization, a cross-linking agent can be arbitrarily incorporated for improving film strength and improving durability after curing. As the cross-linking agent, those that are curable by ultraviolet rays, heat, moisture or the like can be suitably used.

The cross-linking agent is not particularly limited, and can be appropriately selected in accordance with the purpose. Examples thereof include polyfunctional acrylate compounds such as trimethylolpropane tri(meth)acrylate and pentaerythritol tri(meth)acrylate; epoxy compounds such as glycidyl(meth)acrylate and ethylene glycol diglycidyl ether; aziridine compounds such as 2,2-bis(hydroxymethyl)butanol-tris[3-(1-aziridinyl)propionate] and 4,4-bis(ethyleneiminocarbonylamino) diphenylmethane; isocyanate compounds such as hexamethylene diisocyanate and biuret type isocyanate; polyoxazoline compounds having an oxazoline group on a side chain; alkoxysilane compounds such as vinyltrimethoxysilane and N-(2-aminoethyl)-3-aminopropyltrimethoxysilane; and the like. Furthermore, in accordance with the reactivity of the cross-linking agent, a known catalyst can be used, productivity can be improved in addition to the improvement of film strength and durability. These may be used alone or in combination of two or more kinds thereof.

The content of the cross-linking agent is preferably 3% by mass to 20% by mass, more preferably 5% by mass to 15% by mass. When the content of the cross-linking agent is less than 3% by mass, the effect of improving cross-link density may not be obtained, and when the content exceeds 20% by mass, the stability of the cholesteric layer may be deteriorated.

—Air Interface Alignment Control Agent—

An alignment control agent that contributes to stably or rapidly serving as a cholesteric liquid crystal layer of a planar alignment may be added to the liquid crystal composition. Examples of the alignment control agent include fluorine-containing (meth)acrylate-based polymers, and compounds represented by a general formula (1) below. Two or more kinds selected from these may be contained. These compounds can reduce the tilt angle of a molecule of the liquid crystal compound or can make the molecule be horizontally aligned substantially at the air interface of the layer. Meanwhile, "horizontally aligned" in the description of the present application means that the major axis of a liquid crystal molecule and the film face are parallel to each other, but it does not require strict parallelism. In the description of the present application, it means such alignment that a tilt angle formed relative to the horizontal plane is less than 20 degrees. When a liquid crystal compound is aligned horizontally near the air interface, alignment defect is hardly generated. Therefore, transparency relative to light in non-polarized light conversion wavelength region becomes higher, and the degree of polarization relative to light in a polarized light conversion wavelength region can be enhanced. On the other hand, when a molecule in the liquid crystal compound is aligned with a large tilt angle, the helical axis of the cholesteric liquid crystalline phase shifts from the normal line of the film face and thus a reflectance is lowered or a finger print pattern is generated, and the degree of polarization is lowered due to the increase in haze or a diffraction property, which is not preferable.

Fluorine-containing (meth)acrylate-based polymers utilizable as the air interface alignment control agent are described, for example, in Japanese Patent Application Laid-Open No. 2007-272185, paragraphs [0018]-[0043], and the like.

Hereinafter, compounds that are represented by a general formula (1) below and are utilizable as the air interface alignment control agent will be explained.

general formula (1)

In the general formula (1), $R^1$, $R^2$ and $R^3$ each independently represents hydrogen atom or a substituent, and $X^1$, $X^2$ and $X^3$ represent a single bond or a divalent linking group. Each of substituents represented by $R^1$ to $R^3$ is, preferably a substituted or unsubstituted, alkyl group (among these, an unsubstituted alkyl group or a fluorine-substituted alkyl group is more preferable), aryl group (among these, an aryl group having a fluorine-substituted alkyl group is preferable), a substituted or unsubstituted amino group, an alkoxy group and an alkylthio group, and a halogen atom. As each of divalent linking groups represented by $X^1$, $X^2$ and $X^3$, a divalent linking group selected from the group consisting of an alkylene group, an alkenylene group, a divalent aromatic group, a divalent hetero ring residue, —CO—, —NRa— (Ra is an alkyl group having 1-5 carbon atoms or hydrogen atom), —O—, —S—, —SO—, —SO$_2$— and combinations thereof is preferable. The divalent linking group is more preferably a divalent linking group selected from the group consisting of an alkylene group, a phenylene group, —CO—, —NRa—, —O—, —S— and —SO$_2$—, or a divalent linking group obtained by combining at least two groups selected from the group. The number of carbon atoms in the alkylene group is preferably 1 to 12. The number of carbon atoms in the alkenylene group is preferably 2 to 12. The number of carbon atoms in the divalent aryl group is preferably 6 to 10.

Examples of the compound that can be used as the air interface alignment control agent and that is represented by the general formula (1) include compounds described in, for example, Japanese Patent Application Laid-Open No. 2005-99248. As the air interface alignment control agent, compounds represented by the general formula (1) may be used alone or in combination of two or more kinds thereof.

The amount of the compound represented by the general formula (1) that is added to the cholesteric liquid crystalline composition is preferably 0.01% by mass to 10% by mass, more preferably 0.01% by mass to 5% by mass, particularly preferably 0.02% by mass to 1% by mass relative to the total mass of the cholesteric liquid crystal compound.

A surfactant can be used in order to adjust the surface tension of a coated film obtained by applying a cholesteric liquid crystalline composition containing a polymerization initiator and a liquid crystal compound onto a base material film and to thereby make the thickness uniform.

As the surfactant, one that does not disturb the alignment can be appropriately selected and used.

As the surfactant, for example, a nonion-based surfactant containing siloxane, a fluorinated alkyl group in a hydrophobic group portion can be suitably used, and an oligomer having two or more hydrophobic group portions in one molecule is particularly suitable.

As the surfactant, commercially available products can be used. As the commercially available product, for example, PF-151N, PF-636, PF-6320, PF-656, PF-6520, PF-3320, PF-651 or PF-652 of PolyFox manufactured by OMNOVA Solutions Inc., FTX-209F, FTX-208G or FTX-204D of FUTARGENT manufactured by Neos Co., Ltd., KH-40 of Surflon manufactured by AGC SEIMI CHEMICAL CO., LTD., or the like can be used. Furthermore, fluorinated compounds described in paragraph [0087] of Japanese Patent Application Laid-Open No. 2002-341126, and fluorinated compounds described in paragraphs [0064]-[0080] and paragraphs [0092]-[0096] of Japanese Patent Application Laid-Open No. 2005-99248, can be suitably used.

The content of the surfactant is preferably 0.01% by mass to 1% by mass in the cholesteric layer. When the content of the surfactant is less than 0.01% by mass, the surface tension at the air interface is not sufficiently reduced and thus an alignment defect may be generated, and when the content exceeds 1% by mass, an excessive surfactant forms an uneven structure on the air interface side and thus alignment evenness may be lowered.

As a method of manufacturing the cholesteric layer, the cholesteric layer in which cholesteric regularity is fixed can be formed by applying, on a horizontally aligned film on a base material, a cholesteric liquid crystalline composition obtained by dissolving, in a solvent, the polymerizable liquid crystal compound and the polymerization initiator, and the chiral agent, the surfactant and the like which are furthermore added as necessary; drying the same to thereby obtain a coated film; and irradiating the coated film with active light to thereby polymerize the cholesteric liquid crystalline composition. When forming a laminated film including a plurality of cholesteric layers, the laminated film can be obtained by repeating the manufacturing process of the cholesteric layer.

The solvent used for preparing the cholesteric liquid crystalline composition is not particularly limited and can be appropriately selected in accordance with the purpose, and an organic solvent is preferably used.

The organic solvent is not particularly limited and can be appropriately selected in accordance with the purpose. Examples thereof include ketones, alkyl halides, amides, sulfoxides, hetero ring compounds, hydrocarbons, esters, ethers, and the like. These may be used alone or in combination of two or more kinds thereof. Among these, ketones are particularly preferable in consideration of effect on the environment.

The horizontally aligned film can be provided by a technique such as a rubbing treatment of an organic compound or a polymer (resins such as polyimide, polyvinyl alcohol, polyester, polyarylate, polyamide-imide, polyetherimide, polyamide and modified polyamide), oblique deposition of an inorganic compound, formation of a layer having a microgroove, or accumulation of an organic compound (such as co-tricosanoic acid, dioctadecylmethylammonium chloride, methyl stearylate) by a Langmuir-Blodgett process (LB film). Furthermore, an alignment film that generates alignment function by application of an electric field, application of a magnetic field or light irradiation is also known. Among these, an alignment film to be formed by a rubbing treatment of a polymer is particularly preferable. The rubbing treatment can be carried out by unidirectionally rubbing several times the surface of a polymer layer with paper or cloth.

The application of the cholesteric liquid crystalline composition onto the alignment film is not particularly limited and can be appropriately selected, and examples thereof include a curtain coating method, an extrusion coating method, a direct gravure coating method, a die coating method, a spin coating method, a dip coating method, a spray coating method, a slide coating method and the like. Furthermore, the application can also be carried out by transferring the cholesteric liquid crystalline composition coated separately on a substrate, onto the alignment film. By heating the applied cholesteric liquid crystalline composition, the liquid crystalline composition is aligned. The heating temperature is preferably 200° C. or lower, more preferably 130° C. or lower. By the alignment treatment, an thin optical film, in which a polymerizable rod-like nematic liquid crystalline compound is in a twisted-alignment state so as to have a helical axis in a direction substantially perpendicular to the surface of the thin optical film, can be obtained.

The aligned polymerizable rod-like nematic liquid crystalline compound is further polymerized. As to the polymerization, photo polymerization by light irradiation is preferred rather than thermal polymerization. In the light irradiation, the use of ultraviolet rays is preferable. The irradiation energy is preferably 20 mJ/cm$^2$ to 50 J/cm$^2$, more preferably 100 mJ/cm$^2$ to 1,500 mJ/cm$^2$. In order to accelerate the photo polymerization reaction, the light irradiation may be carried out under a heated condition or a nitrogen atmosphere. The wavelength of irradiation ultraviolet rays is preferably 350 nm to 430 nm. As to a polymerization reaction ratio, a higher one is preferable, 70% or more is preferable, and 80% or more is more preferable, from the viewpoint of stability.

The polymerization reaction ratio can be determined by measuring a consumption ratio of a polymerizable functional group by using an IR absorption spectrum.

The thickness of the cholesteric layer is preferably 0.1 μm to 50 μm, more preferably 0.5 μm to 10 further more preferably 1.5 μm to 7 μm.

—(2) One Including a Linearly Polarizing Reflection Plate and a Quarter Wave Plate—

Examples of the linearly polarizing reflection plate include (i) a linearly polarizing reflection plate of a multilayer structure, (ii) a polarizer in which thin films having different birefringent properties are laminated, (iii) a wire grid-type polarizer, (iv) a polarization prism, (v) an anisotropic scattering type polarizing plate, and the like.

As the quarter wave plate, one similar to those described above can be used.

(i) As the linearly polarizing reflection plate of a multilayer structure, one constituted by laminating dielectric thin films having different refractive indices from each other in plural layers is included. In order to make a wavelength selective reflection film, alternate lamination of a dielectric thin film of a high refractive index and a dielectric thin film of a low refractive index in plural layers is preferable. The kind of the layer is not limited to two kinds, but may be more kinds.

The number of layers to be laminated is preferably 2-20, more preferably 2-12, further more preferably 4-10, and particularly preferably 6-8. When the lamination number exceeds 20, multilayer deposition lowers production efficiency and the purpose and effect of the present invention may not be achieved.

The lamination order of dielectric thin films is not particularly limited and can be appropriately selected in accordance with the purpose, and for example, when an adjacent film has a high refractive index, a film having a lower refractive index than the adjacent film is laminated first. In an opposite manner, when an adjacent layer has a low refractive index, a film having a higher refractive index than the layer is laminated first. A boundary line whether the refractive index is high or low is 1.8. Whether a refractive index is high or low is not an absolute matter, but even among materials of high refractive indices, materials having a relatively large refractive index and a relatively small one may exist and these may be used alternately.

Examples of the material of a dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, $ZrO_2$, and the like. Among these, $Bi_2O_3$, $CeO_2$, $CeF_3$, $HfO_2$, $SiO$, $Ta_2O_5$, $TiO_2$, $Y_2O_3$, $ZnSe$, $ZnS$ and $ZrO_2$ are preferable, and $SiO$, $Ta_2O_5$, $TiO_2$, $Y_2O_3$, $ZnSe$, $ZnS$ and $ZrO_2$ are particularly preferable.

Examples of the material of a dielectric thin film having a low refractive index include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, $ThF_4$, and the like. Among these, $Al_2O_3$, $BiF_3$, $CaF_2$, $MgF_2$, $MgO$, $SiO_2$ and $Si_2O_3$ are preferable, and $Al_2O_3$, $CaF_2$, $MgF_2$, $MgO$, $SiO_2$ and $Si_2O_3$ are particularly preferable.

In the material of a dielectric thin film, a molecular ratio is also not particularly limited, and can be appropriately selected in accordance with the purpose. The atomic ratio can be adjusted by changing the concentration of an atmospheric gas at the time of film formation.

A method for forming a dielectric thin film is not particularly limited but can be appropriately selected in accordance with the purpose, and examples thereof include vacuum evaporation methods such as an ion plating method and an ion beam method, physical vapor deposition methods (PVD method) such as sputtering, chemical vapor deposition methods (CVD method), and the like. Among these, the vacuum evaporation method and the sputtering method are preferable, and the sputtering method is particularly preferable.

As the sputtering method, a DC sputtering method with a high deposition rate is preferable. In the DC sputtering method, the use of a material of high conductivity is preferable.

Furthermore, as a method for performing multilayer deposition by the sputtering method, there are, for example, (1) a one chamber method that performs deposition alternately or in order from a plurality of targets in one chamber, and (2) a multi chamber method that performs deposition continuously in a plurality of cambers. Among these, from the viewpoint of productivity and prevention of material contamination, the multi-chamber method is particularly preferable.

The thickness of the dielectric thin film is, in an optical wavelength order, preferably $\lambda/16$ to $\lambda$, more preferably $\lambda/8$ to $3\lambda/4$, further more preferably $\lambda/6$ to $3\lambda/8$.

In an evaporated layer of a dielectric substance, a part of light transmitting in the evaporated layer of a dielectric substance is multiply reflected for every dielectric thin film and these reflected rays of light interfere with one another, and only light having a wavelength determined by the product of the thickness of the dielectric thin film and the refractive index of the film for the light is transmitted selectively. Furthermore, the central transmission wavelength of the evaporated layer of a dielectric substance has an angle dependency relative to incident light, and the transmission wavelength can be changed by changing incident light.

(ii) As a polarizer in which thin films having different birefringent properties are laminated, those described in Japanese Unexamined Patent Application Publication (Tanslation of PCT application) No. 09-506837 or the like can be used.

Specifically, by performing processing under conditions selected for obtaining the relationship of refractive indices, a polarizer can be formed by widely using various materials. Generally, one of first materials is required to have a refractive index different from that of a second material in a selected direction. The difference in refractive indices can be achieved by various methods including stretching during film formation or after film formation, extrusion molding and coating. Furthermore, two materials preferably have similar rheologic properties (for example, molten viscosity) so that they can be coextruded.

As a polarizer obtained by laminating thin films having different birefringent properties, a commercially available product can be used. Examples thereof include a trade name DBEF manufactured by 3M Ltd.

(iii) The wire grid-type polarizer is a polarizer that lets one polarized light component be transmitted and the other component be reflected, by birefringence of thin metal wires.

The wire grid polarizer is a polarizer obtained by arranging periodically metal wires, and is used mainly as a polarizer in a terahertz wave band. In order for a wire grid to function as a polarizer, it becomes necessary that the interval between wires is sufficiently smaller than the wavelength of incident electromagnetic wave.

In the wire grid polarizer, metal wires are disposed at regular intervals. A polarized light component in a polarization direction that is parallel to the longitudinal direction of the metal wire is reflected by the wire grid polarizer, and a polarized light component in the perpendicular polarization direction passes through the wire grid polarizer.

As the wire grid-type polarizer, a commercially available product can be used. Examples of the commercially available product include a wire grid polarizing filter 50×50, NT46-636 manufactured by Edmund Optics Inc., and the like.

—Diffusing Plate or Retardation Plate—

Either a diffusing plate or a retardation plate may be provided between the light source and the circularly polarizing reflection plate. With a diffusing plate or a retardation plate, the reflected light can be depolarized when recycled, resulting in improvement of the recycling efficiency of light.

Phase difference in in-plane direction (in-plane retardation Re) of the retardation plate is preferably 300 nm or more at a wavelength of 550 nm, more preferably 1,000 nm or more. When the phase difference in in-plane direction is less than 300 nm at a wavelength of 550 nm, the depolarization may become insufficient, thereby resulting in a low recycling efficiency.

The diffusing plate or retardation plate may also serve as a base material.

The diffusing plate or retardation plate may contain an UV absorbing agent.

<<Optical Filter>>

In the illumination apparatus of the present invention, the polarization state-control member may include an optical filter.

Examples of the optical filter include an optical filter having a configuration of combining a wavelength selective filter and a circularly-polarizing plate in order to cause right-circularly polarized light to be generated in any of the wavelength region of 300 nm or higher and 600 nm or lower, in particular in the wavelength of blue light. As the wavelength selective filter, a filter such as an interference filter that transmits a desired wavelength region and reflects the other wavelengths can be used. In addition, an absorption-type filter that transmits a desired wavelength region and absorbs the other wavelengths can also be used. Furthermore, the wavelength selective filter may be a filter that transmits exclusively right-circularly polarized light in a desired wavelength and transmits left- and right-circularly polarized light in the other wavelengths. Filters of this type can be realized by an optical element using cholesteric liquid crystal or structural birefringence. A conventionally known filter can be used as the interference filter and one formed by vacuum evaporation, lamination of an organic compound, or the like can be used. The absorption-type filter may be formed by applying dye or pigment that absorbs a specific wavelength to a substrate or by kneading the same in a support.

The wavelength selective filter and the circularly-polarizing plate may be in either order relative to the light source. When the wavelength selective filter exhibits birefringence that largely changes a polarization state, the wavelength selective filter is arranged on the light source side.

When a protective plate or the like for the circularly-polarizing plate is to be disposed on the side opposite to the light source, it is necessary to select a plate of a material whose birefringence is controlled to the extent of not largely changing the polarization state.

(Use Application)

The illumination apparatus of the present invention is preferably used as, in particular, an illumination for plant cultivation. By using the illumination apparatus of the present invention as an illumination for plant cultivation, the growth of a plant can be remarkably accelerated. In addition, a specific component of a plant such as fragrance can be increased.

A plant to which the illumination apparatus of the present invention is to be applied is not particularly limited. Examples thereof include plants such as class Magnoliopsida and class Monocotyledoneae or the like of phylum Angiospermae, class Magnoliopsida, subclass Magnoliidae, subclass Hamamelidae, subclass Caryophyllidae, subclass Dilleniidae, subclass Rosidae, subclass Asteridae, and the like.

Among these, examples of the subclass Asteridae include order Gentianales, order Solanales, order Lamiales, order Callitrichales, order Plantaginales, order Scrophulariales, order Campanulales, order Rubiales, order Dipsacales, order Calycerales, order Asterales, and the like. Among these, order Lamiales and order Solanales are preferable.

Examples of order Lamiales include family Oleaceae, family Calceolaria, family Gesneriaceae, family Plantaginaceae, family Stilbaceae, family Scrophulariaceae, family Martyniaceae, family Verbenaceae, family Schlegeliaceae, family Lentibulariaceae, family Bignoniaceae, family Acanthaceae, family Pedaliaceae, family Lamiaceae, family Phrymaceae, family Paulowniaceae and family Orobanchaceae. Among these, family Lamiaceae, family Phrymaceae, family Paulowniaceae and family Orobanchaceae are preferable.

Examples of family Lamiaceae include genus *Agastache*, genus *Ajuga*, genus *Amethystea*, genus *Chelonopsis*, genus *Clinopodium*, genus *Coleus*, genus *Dracocephalum*, genus *Elsholtzia*, genus *Galeopsis*, genus *Glechoma*, genus *Hyptis*, genus *Hyssop*, genus *Keiskea*, genus *Lamium*, genus *Lavandula*, genus *Leonurus*, genus *Leucas*, genus *Leucosceptrum*, genus *Loxocalyx*, genus *Lycopus*, genus *Marrubium*, genus *Meehania*, genus *Melissa*, genus *Mint* (Menthe), genus *Monarda*, genus *Mosla*, genus *Nepeta*, genus *Ocimum*, genus *Origanum*, genus *Perilla*, genus *Isodon*, genus *Pogostemon*, genus *Prunella*, genus *Rosmarinus*, genus *Firmiana* (genus *Salvia*), genus *Satureja*, genus *Scutellaria*, genus *Stachys*, genus *Suzukia*, genus *Teucrium*, genus *Thymus*, genus *Callicarpa*, genus *Caryopteris*, genus *Clerodendrum*, genus *Premna*, genus *Tectona* and genus *Vitex*.

Specifically, basil (sweet basil) of genus *Ocimum*, family Lamiaceae is included.

EXAMPLES

Hereinafter, Examples of the present invention will be explained, but the present invention is not limited to these Examples at all.

<Production of Illumination Apparatus (Illumination System)>

The following lamps as light sources and the following filters as polarization state-control members were prepared, respectively.

(LED Lamps)

White: a fluorescent substance was exited by a 460 nm LED to emit the entire visible light region (E26-L020 CREE, manufactured by Fuji Electronics Industry Co., Ltd.)

Blue: 460 nm LED (7W/L020 blue, Fuji Electronics Industry Co., Ltd.)

Red: 630 nm LED (7W/L020 red, Fuji Electronics Industry Co., Ltd.)

Figure 2:
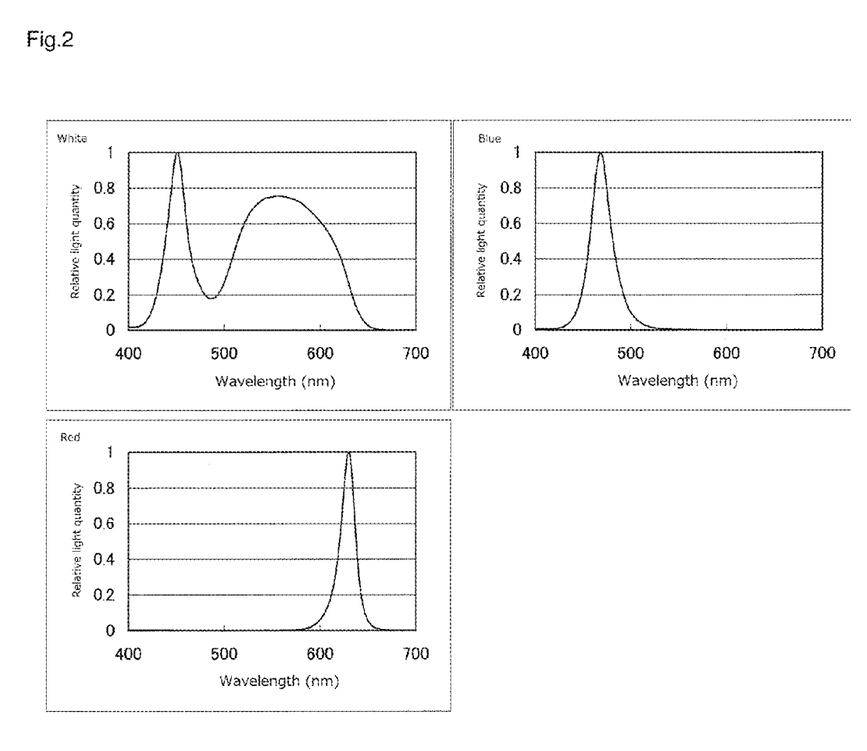
FIG. 2 is a drawing showing a spectrum of a relative light quantity of a lamp used in Examples.

A spectrum of a relative light quantity of each of lamps is shown in FIG. 2.

(Filter)

Figure 3:
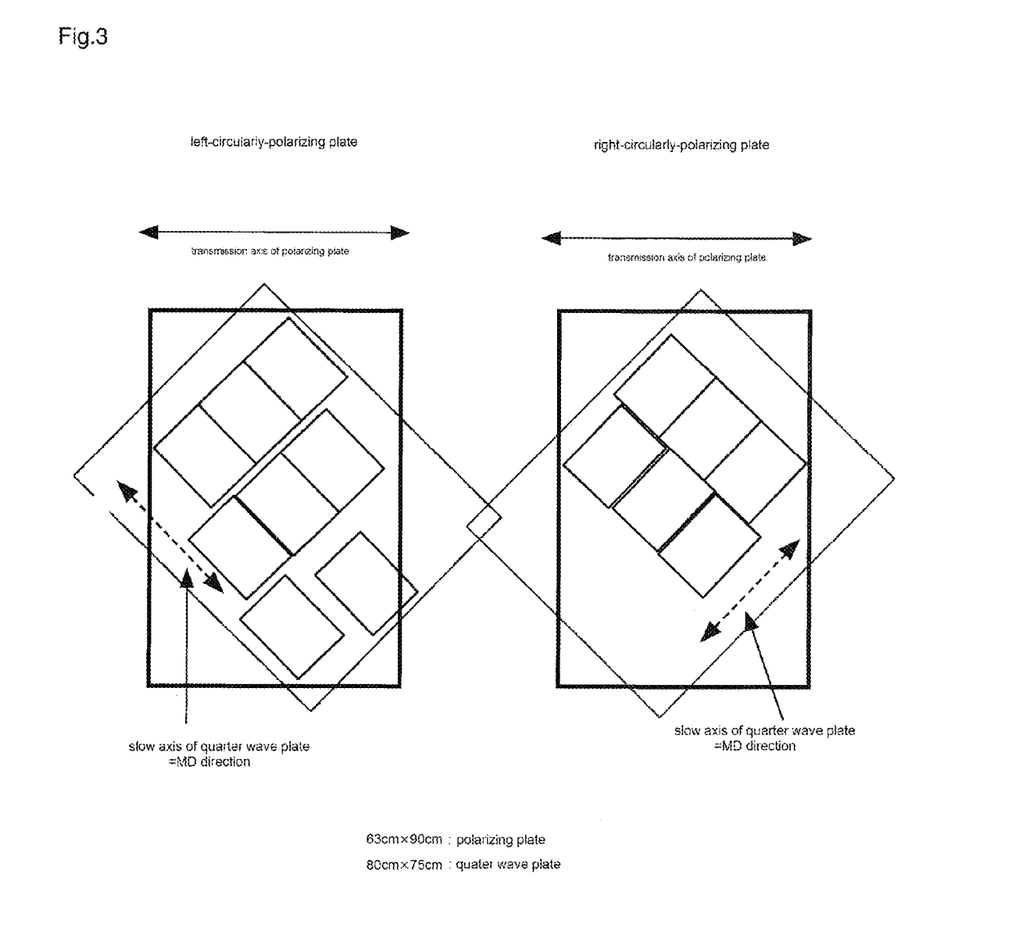
FIG. 3 is a drawing schematically showing configurations of a left-circularly-polarizing plate (L) and a right-circularly-polarizing plate (R) used in Examples.

N: a semitransparent film obtained by printing black halftone dots with an electrophotographic type printer to thereby give the same light transmission quantity as L and R L: produced by pasting a retardation plate (quarter wave plate) on a linearly-polarizing plate R: produced by pasting a retardation plate (quarter wave plate) on a linearly-polarizing plate In the production of the left-circularly-polarizing plate (L) and the right-circularly-polarizing plate (R), a plate of an adhesive-free high polarization degree type (a high contrast polarization film, manufactured by Edmund Optics) was used as a polarizing plate, and modified polycarbonate (Teijin Limited) was used as a quarter wave plate. In the production of either of L and R, a mirror was placed in the lowest position and the pasting was performed at an angle at which the reflected light was darkest. The pasting angle measured by a protractor at this time was 45° in either of L and R. The configurations of the left-circularly-polarizing plate (L) and the right-circularly-polarizing plate (R) are schematically shown in FIG. 3.

The percentage of right-circularly polarized light of the illumination system produced as described above is shown in Table 1. The measurement for calculating the percentage of right-circularly polarized light was performed by the measurement of the circularly-polarized light quantity at the bottom of a box in a system used in plant cultivation to be described later. The circularly-polarizing plate was mounted on a spectrophotometer (model number: USB2000, manufactured by Ocean Optics), and the measurement was performed by varying the incident angle of light plural times at respective wavelengths and the average value thereof was utilized.

TABLE 1

| | | Filter | | | | |
|---|---|---|---|---|---|---|
| | | N | | L | | R |
| | | Ratio of circularly-polarized light | | | | |
| | | 460 nm | 630 nm | 460 nm | 630 nm | 460 nm | 630 nm |
| LED | White | 0.5 | 0.5 | 0.1 | 0.1 | 0.9 | 0.9 |
| | Blue | 0.5 | (0.5) | 0.1 | (0.5) | 0.9 | (0.5) |
| | Red | (0.5) | 0.5 | (0.5) | 0.1 | (0.5) | 0.9 |

(0.5) indicates that the light quantity is approximately 0. Since it is considered that the light quantity is 0 and there is no polarization effect, (0.5) is denoted, meaning neutral.

<Plant Cultivation>

A box of a cube having a side of 20 cm was prepared through the use of a black acrylic plate, and the box was configured such that light entered the inside by not pasting a board on the upper face thereof. Black was selected as the color so that the plant was not irradiated again with light having changed or depolarized the polarization at the walls. Inside the box, a stainless steel vessel was disposed, in which vermiculite was placed to the depth of 80%, and then a liquid fertilizer was immersed to the upper face thereof. Here, seeds of basil were seeded. Either of the above-described filters was placed on the upper surface of the box, and, furthermore, a lamp was disposed so that the filter was irradiated vertically with the light of the lamp. The cultivation was performed under the environment adjusted at 25±2° C. with an air conditioner. Thinning was performed after the growth to cotyledon, and thinning was finally performed after the growth of a true leaf such that those of the size of the same degree were maintained. The cultivation was performed for 50 days after the seeding of the seeds, and the mass was measured. In addition, after the cultivation, the intensity of fragrance was evaluated based on the fragrance when the lamp was removed and the filter on the upper surface of the cultivation box was opened. The evaluation was performed as follows.

(Evaluation of Fragrance)

The evaluation was performed by five members and respective evaluations were denoted by "strong: 3 points, normal: 2 points, weak: 1 point," which were totalized and evaluation for average values was performed using each of the following definitions.

3 to 2.5 or more: strong;

less than 2.5 and 1.5 or more: normal;

less than 1.5 and 1 or more: weak

Results are shown in Tables 2 and 3. Note that, in Tables, values represent mass ratios of the basil, which are normalized values of measured each mass based on the smallest weight for respective LEDs.

TABLE 2

| Cultivation results | | | | |
|---|---|---|---|---|
| | | Filter | | |
| | | N | L | R |
| LED | White | 1.3 | 1.0 | 1.5 |
| | Blue | 1.7 | 1.0 | 2.7 |
| | Red | 2.7 | 1.9 | 1.0 |

TABLE 3

| Cultivation results (fragrance) | | | | |
|---|---|---|---|---|
| | | Filter | | |
| | | N | L | R |
| LED | White | Weak | Weak | Normal |
| | Blue | Normal | Weak | Strong |
| | Red | Normal | Normal | Weak |

The results shown in Tables 2 and 3 indicate that, by setting blue light to be right-circularly polarized light, particularly the growth effect is high and the fragrance is also high.

While the present invention has been described in detail and with reference to specific embodiments thereof, it will be apparent to one skilled in the art that various changes and modifications can be made therein without departing from the spirit and scope thereof. All the publications referred to in the present specification are expressly incorporated herein by reference in their entirety. The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

KEY TO THE NUMBERS

1: housing
2: reflection surface (reflection film)
3: light source
4: polarization state-control member

The invention claimed is:

1. An illumination apparatus for plant cultivation, comprising a unit configured to change light in any wavelength region of 300 nm or higher and 600 nm or lower to light in the wavelength region comprising dominantly a right-circularly polarized light component, and the illumination apparatus emitting substantially non-polarized light in at least a part of wavelengths of 601 nm to 800 nm.

2. The illumination apparatus according to claim 1, comprising a unit configured to change light of wavelengths of 452 nm to 474 nm to light of wavelengths of 452 nm to 474 nm comprising dominantly a right-circularly polarized light component.

3. The illumination apparatus according to claim 1, emitting substantially non-polarized light in wavelengths of 620 nm to 640 nm.

4. The illumination apparatus according to claim 1, wherein the unit substantially does not change a polarization stage of light of wavelengths of 620 nm to 640 nm.

5. The illumination apparatus according to claim 1, comprising a light source.

6. The illumination apparatus according to claim 5, wherein the light source comprises a blue light-emitting diode.

7. The illumination apparatus according to claim 1, wherein the unit comprises a polarizing plate and a retardation plate.

8. The illumination apparatus according to claim 1, comprising a light source that emits light of wavelengths of 452 nm to 474 nm, a light source that emits light of wavelengths of 620 nm to 640 nm and a unit configured to change light in a wavelength region of wavelengths of 452 nm to 474 nm to light having dominantly a right-circularly polarized light component in a wavelength region of wavelengths of 452 nm to 474 nm, and the illumination apparatus emitting substantially non-polarized light in wavelengths of 620 nm to 640 nm.

9. The illumination apparatus according to claim 1, comprising a light source that emits light of wavelengths of 452 nm to 474 nm, a light source that emits light of wavelengths of 620 nm to 640 nm and a unit configured to change light in a wavelength region of wavelengths of 452 nm to 474 nm to light having dominantly a right-circularly polarized light component in a wavelength region of wavelengths of 452 nm to 474 nm and substantially not to change a polarization state of light of wavelengths of 620 nm to 640 nm.

* * * * *